Oct. 7, 1947.  M. A. POWERS  2,428,470
GLASS WOOL PLATE ELEMENT FOR STORAGE BATTERIES
Filed Feb. 2, 1942
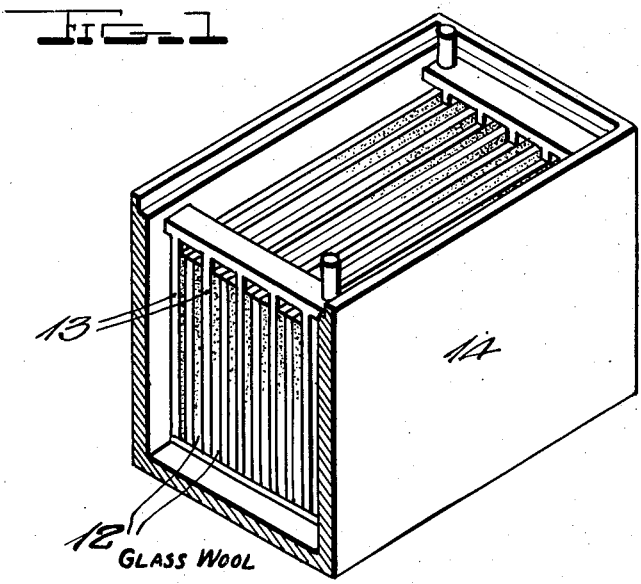
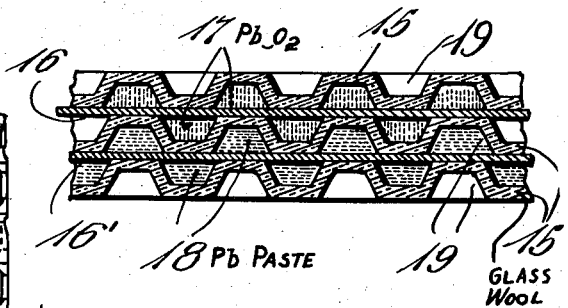
Inventor
MILTON A. POWERS,
By Ralph L. Stevens
Attorney Patented Oct. 7, 1947

2,428,470

UNITED STATES PATENT OFFICE 2,428,470

GLASS WOOL PLATE ELEMENT FOR STORAGE BATTERIES

Milton A. Powers, Detroit, Mich.

Application February 2, 1942, Serial No. 429,322

3 Claims. (Cl. 136—59)

1

The present invention relates to the internal structure of storage batteries, and particularly to the wet cell construction of batteries of the lead plate type.

This application is in part a continuation of certain subject matter of my earlier application, Serial No. 303,277, filed November 7, 1939, for "Porous products and their manufacture," now Patent No. 2,271,829, granted Feb. 3, 1942, wherein there is disclosed a porous plate of vitrified material formed by compressing and heating a sheet of mineral wool, such as the well known rock and glass wools. A plate of this material was found to be highly useful in storage battery construction because of its large electrolyte capacity and its resistance to deterioration; and further because it can be utilized advantageously to carry the active sponges or pastes, thus permitting the metal plates to be thinner and the battery to be of smaller size and lighter in weight.

The primary objects of the present invention are to utilize plates of this porous material in storage batteries; to provide a similar but cheaper and substantially improved material for the same use; and to devise a novel internal structural arrangement of metal plates and separators that is particularly adapted to the incorporation of the non-metallic mineral sheet materials of my invention.

These and many more specific objects of this invention will clearly appear from a study of the accompanying drawings, and especially from a thorough consideration of the subject matter which follows a description of the several views which comprise the same.

In the drawings:

Fig. 1 illustrates a cell of a lead-plate storage battery, with its cover removed and one end cut away to show the use of the sheet material of my invention as a plate separator.

Fig. 2 is a sectional view, as seen along line 2—2 in Fig. 3, illustrating a modification of the internal cell structure of Fig. 1.

Fig. 3 is a face view of a fragmentary portion of one of the paste-carrying separators of Fig. 2, with its paste removed.

With continued reference to the drawings, and particularly to Fig. 1 thereof for the moment, thin plates 12 made from compacted glass wool or the like are used as separators for the lead plates 13 of a storage battery cell 14. These separators, when formed by the method taught in my aforementioned patent or by variations thereof subsequently disclosed, have adequate strength, sufficient porosity for the free passage of the electrolyte, and ability to withstand the heat of burning the battery parts together during assembly, and they are unaffected by the electrolytic acid. If desired, vertical channels or equivalent means may be provided on the surfaces of the

2 separators 12 to enhance the escape of gases and the gravitational movement of grid material towards the bottom of the cell.

A modified arrangement of storage battery elements is disclosed in Figs. 2 and 3. Here the compacted and heat-treated glass wool plates, 15, function both as separators for the lead plates 16 and 16" and as holders for the two types of paste 17 and 18 that usually are carried by the lead plates. This permits the use of very thin lead plates and the construction of a battery much lighter in weight and lower in cost than those now marketed. In the preferred arrangement shown, the paste-pockets or recesses 19 are formed by properly shaping the steel plates that are used as dies during heat treatment and compression of the glass wool. These pockets are shown unfilled in Fig. 3. As seen in Fig. 2, the assembled plates are pressed or held together so that there is good surface contact between the pastes and the lead plates.

The pastes 17 and 18 are a peroxide of lead and a finely divided lead for association respectively with the positive and negative electrode plates 16 and 16". Obviously they may be varied within the field of equivalents, and of course the invention is not confined to the use of vitrified wool as separators and paste-holders for batteries of only the lead plate type.

In the already described non-metallic plates comprising glass wool formed under heat into flat sheets of special form as desired, the resulting material is essentially a latticework of glass filaments with a relatively large volume between the interlacing filaments. Obviously the space volume may be varied within wide limits by controlling the process and by preselection of the filament size in the wool to be processed. Thus if heavy filaments are used and the material only slightly reduced in volume during processing the resulting plates will be of a coarse structure. On the other hand if extremely fine filaments are used and the reduction in volume is large, the sheet so produced will have the very desirable characteristics of extremely fine porosity for carrying the electrolyte, yet such interstices will be too small to allow any infiltration of the lead oxides from the surfaces of the sheets. However, the cost of plates entirely constructed from the extremely fine filaments is obviously greater than from coarser material and in the search to reduce such cost some important variations have been produced. By introducing a porous filling medium into the relatively large openings found in a very coarse filament sheet of my construction, the structural strength and other qualities were preserved yet the advantages of the extremely fine porosity found heretofore only in sheets made from the finest filaments was also obtained. Various forms of filler were tried including fuller's earth, bentonite, tripoli, diatomaceous earth, fireclay and combinations of these and other materials with varying results. While such fillers may be introduced previous to the firing process, it appears preferable to add them after the sheet has been produced as described above. It is then very easy to apply the filler by mixing it with water or other volatile liquid, then placing on the sheet by troweling, dipping or spraying, and then drying. While volume production might indicate some advantages for the spraying method, I have found dipping a very simple and effective procedure. The diatomaceous earth is mixed with a relatively large amount of water, the result being further improved if a small amount of aerosol or other surface tension reducing agent is added to increase the rapidity of penetration into the glass structure.

When the liquid mixture meets the surface of the porous glass, capillarity instantly draws the liquid inward. However there is also a definite filtering action, whereby the heaviest deposit of diatoms occurs at the outer surface with a progressively reduced deposit toward the center. Of course all deposit stops when the glass becomes saturated with liquid. Thus by predetermining the amount of water in the mixture the total amount of deposit of solid matter is definite, the outer surfaces carrying a substantially solid facing of diatoms and less inside. This characteristic is very desirable as the surface of the sheet thus presents a solid face of extreme porosity to the lead paste of the plate, yet there remains a very large open space in the remainder of the separator to hold a maximum of electrolyte.

Continuing development of separator construction incorporating glass filaments as support members for a porous material such as diatomaceous earth or other medium which in itself is structurally weak, I have found that it is practical to impregnate a mass of glass filament with such porous material, and by proper proportioning and procedure produce a low cost separator element having superior qualities of porosity, resiliency, and freedom from deterioration. This also lends itself ideally to my method of battery construction described in greater detail at other points in this specification.

One method I have used comprises the chopping of a mass of extremely fine glass filaments, known commercially as "silk wool," into lengths convenient for mixing. These are added slowly to a water mixture including principally diatomaceous earth or similar porous material. Some difficulty may be encountered due to the tendency of the mixture to "lump" but this may be reduced by adding more water and energy of mixing. Aerosol wetting solution may also be added if desired. Bentonite additions may be desirable to increase bulk and porosity, while small amounts of sodium silicate may increase adhesion upon drying. However too much sodium silicate reduces porosity of the finished product and also stiffens the sheet to the point where it may shatter upon shock rather than maintain maximum resiliency.

The present preferred method of making the non-metallic sheet is to apply a water mix layer of porous material to a sheet of glass fiber of the type identified as "battery mats" and manufactured for the trade by the Owens Corning Fiberglas Co. of Toledo, Ohio. The proper thickness of this material is selected and impregnated to form a seemingly solid sheet, by dipping or by pouring the mixture onto the sheet, or by spraying. However, as selective penetration as described previously also occurs here, the method may have to be varied to suit the circumstances. In quantity production the glass fibers no doubt would be laid down as a continuous strip, and in such case it would be perfectly feasible to spray a mixture of porous material simultaneously. The sheet could then be dried and moved continuously for further processing.

The non-metallic mineral portions 12 and 15 of the plate assemblies of Figs. 1 to 3 may be formed by any of the modified methods just described.

Variations in the above described methods and structures will be obvious to those skilled in the art after consideration of my disclosure, and therefore I wish to be limited only by reasonable interpretation of the claims.

What is claimed is:

1. An element for separating the positive and negative pastes of a storage battery unit, said element comprising fused and vitrified but porous non-conducting mineral wool having only its surfaces impregnated with minute particles that are dielectric and resistant to destruction by the battery electrolyte.

2. The method of forming a plate element for storage batteries, comprising the steps of compressing and heating a sheet of fluffy glass wool, shaping said sheet while hot to form a porous plate having paste-receiving cavities, cooling said plate to rigidity, and then applying active paste to the cavities.

3. In a method of forming battery plates, the steps of shaping a hot fibrous mass of fluffy non-metallic mineral wool into a thinner porous element having cavities for the reception of active paste, and filling said cavities with active paste after said element has cooled to hardness.

MILTON A. POWERS.

REFERENCES CITED

The following references are of record in the file of this patent:

UNITED STATES PATENTS

| Number | Name | Date |
|---|---|---|
| 636,142 | Hodgson | Oct. 31, 1899 |
| 1,938,982 | Smith | Dec. 12, 1933 |
| 1,874,404 | Wood | Aug. 30, 1932 |
| 2,015,006 | Ekisler | Sept. 17, 1935 |
| 2,271,829 | Powers | Feb. 3, 1942 |
| 1,966,644 | Pollock | July 17, 1934 |
| 441,413 | Hatch | Nov. 25, 1890 |
| 561,872 | Dormael | June 9, 1896 |
| 552,322 | Krotz et al. | Dec. 31, 1895 |
| 563,428 | Still | July 7, 1896 |
| 2,043,954 | Kershaw | June 9, 1936 |
| 2,016,401 | Thomas | Oct. 8, 1935 |
| 2,117,371 | Slayter | May 17, 1938 |
| 2,310,932 | Brennan | Feb. 16, 1943 |
| 491,726 | Macleod | Feb. 14, 1893 |
| 464,676 | Morrison | Dec. 8, 1891 |
| 1,555,046 | West | Sept. 29, 1925 |
| 1,879,562 | Smith | Sept. 27, 1932 |
| 1,942,668 | Smith | Jan. 9, 1934 |
| 482,044 | Kennedy et al. | Sept. 6, 1892 |
| 1,649,579 | Edison | Nov. 15, 1927 |

FOREIGN PATENTS

| Number | Country | Date |
|---|---|---|
| 537,377 | Great Britain | June 19, 1941 |
| 467,696 | Great Britain | June 22, 1937 |
| 475,464 | Great Britain | Nov. 19, 1937 |